United States Patent [19]
Landon

[11] 3,746,508
[45] July 17, 1973

[54] PROCESS FOR REMOVING SOIL FROM LAND FOR TREATING CLEANING MOPS AND RAGS

[75] Inventor: Steven Landon, Huntington, N.Y.

[73] Assignee: Washex Machinery Corporation, Plainview, N.Y.

[22] Filed: Mar. 29, 1971

[21] Appl. No.: 128,926

[52] U.S. Cl. ............................ 8/141, 68/1, 68/18 F, 252/88
[51] Int. Cl. .............................................. B08b 7/00
[58] Field of Search ................. 8/141; 252/88; 68/1, 68/18 F

[56] References Cited
UNITED STATES PATENTS

| | | | |
|---|---|---|---|
| 3,577,215 | 5/1971 | Impullitti | 8/141 |
| 2,055,938 | 9/1936 | McKeon | 8/141 |
| 3,327,507 | 6/1967 | Landow | 68/24 |

*Primary Examiner*—Mayer Weinblatt
*Attorney*—James A. Eisenman and Robert R. Strack

[57] ABSTRACT

There is disclosed an apparatus and method for cleaning and processing highly soiled articles, such as commercial oil-impregnated dust mops and cleaning cloths, in a closed, relatively pollution-free cycle in which the soiled work is cleaned by immersion and tumbling in large volumes of the impregnating oil medium in a succession of cycles and in which a plurality of reservoirs of the oil medium are maintained having different degrees of soil impurity and in which the most contaminated batch is recycled through a continuous filter utilizing an expendible filtering medium and a vacuum to achieve a dry waste disposal composed of inert filtering material, inert soil, and insignificant quantities of residual oil.

5 Claims, 1 Drawing Figure

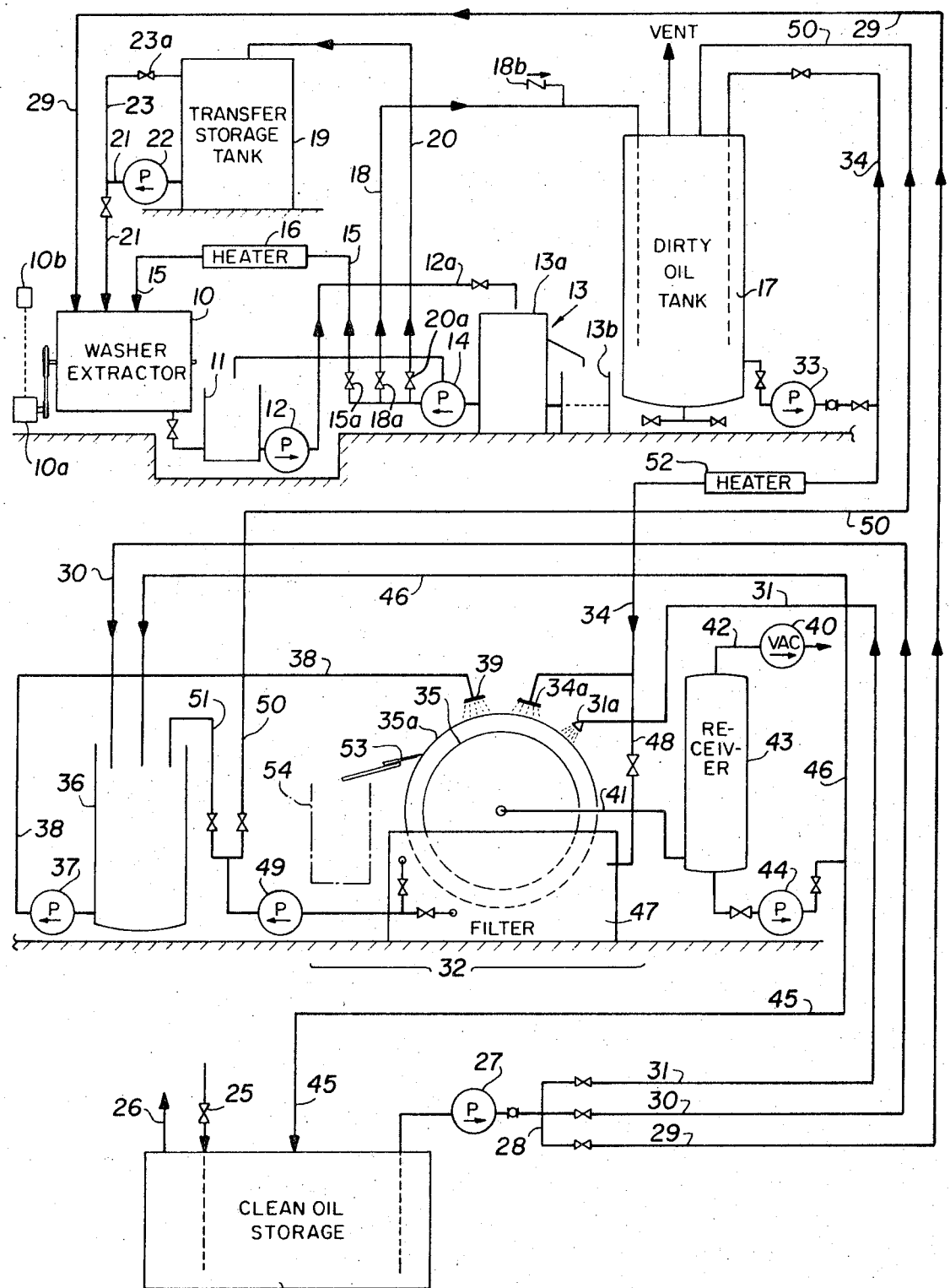

PROCESS FOR REMOVING SOIL FROM LAND FOR TREATING CLEANING MOPS AND RAGS

BACKGROUND OF THE INVENTION

Oil-impregnated commercial dust mops and cleaning cloths typically accumulate as much as 20 percent of their weight in non-soluble particulate soil, as opposed for example to a mere 1 to 2 percent of soil for mechanics' overalls. They are able to hold this high proportion of soil by the combined action of the textile fibers and the impregnating oil. The high efficiency of these cleaning devices is offset, however, by the relatively high cost of removing soil and reimpregnating with clean oil.

In addition to the cost of reprocessing, there is a serious environmental pollution problem. When water and detergent laundering are used, particulate soil, impregnating oil, and detergents, are flushed into the sewer system, both clogging sewage processing plants and polluting waterways. Moreover, substantial weakening of the textile fiber is caused by the process. Another commonly used system for reprocessing highly soiled work, such as cleaning implements, is drycleaning in which the work is tumbled in a solvent bath to solubilize the oil and remove the soil. The work is then tumbled to remove traces of solvent and passed on to an oil-impregnating spray or bath, the latter requiring in addition an extraction operation to achieve the correct degree of oil impregnation. A significant problem in the drycleaning process is that the insoluble soil must be removed from the solvent by filtering, the oil must be distilled out of the solvent, and large amounts of lint and fiber must be extracted. Ordinary drycleaning filters are inadequate for such loads, requiring as much as 600 lbs. of filter powder to clean the amount of solvent needed to clean 1000 lbs. of commercial mops. The filter residue is in the form of an oil and solvent saturated muck which is not only difficult to handle but an environmental pollutant in its ultimate disposition. Accordingly, it is one object of the present invention to provide improved apparatus and method for the cleaning and reprocessing of highly soiled textile cleaning implements, such as oil-impregnated mops.

Another object of the invention is to provide improved apparatus and method for reprocessing highly soiled or contaminated cleaning implements which are relatively free of the problems of environmental pollution and which eliminate both water and solvent washing and drying steps.

Still another object of the invention is to provide apparatus and methods for reprocessing highly soiled cleaning implements which result in faster processing than conventional methods, but at the same time are less damaging to the textile structure of the cleaning implements.

SUMMARY OF THE INVENTION

In accordance with the present invention, cleaning implements such as commercial oil-impregnated cleaning mops and cloths containing a high percentage by weight of particulate soil are immersed and tumbled in a bath of the impregnating medium, preferably heated for reducing viscosity and for purposes of sterilization. A number of successive washing cycles are preferred, one or more of which may if desired be followed by a brief extraction cycle to reduce the volume of entrained oil. The oils from the successive batches can be selectively directed among two or more holding tanks having different gradations of soil content, with clean oil being discharged into the washing and tumbling apparatus. The clean oil is supplied by a filter which is operated with an air-pressure differential across an expendible filtering medium, such as diatomaceous earth carried on a drum partially immersed in soiled oil. The air-pressure differential across the filtering medium, achieved for example by means of a vacuum pump, results in the continuous buildup of a relatively dry particulate soil layer having an almost negligible volume by weight of residual oil. As fast as the layer accumulates, it is removed by a scraper which skims off all of the soil together with a thin scraping of filter material, resulting in a relatively dry waste which is largely comprised of inert materials which can be readily disposed of by dumping as a harmless earth fill.

It is preferred to include a separate lint filter in the system, in the form of a shaker screen connected in a continuously operating loop during the washing and tumbling cycle. Consequently, there are no materials either of the soil or of a processing nature which are dumped into the sewers, and there is no wet or saturated muck waste which is characteristic of conventional drycleaning operations.

BRIEF DESCRIPTION OF THE DRAWING

The accompanying drawing is a schematic diagram of a cleaning and reprocessing apparatus for cleaning and reprocessing highly soiled textiles, such as commercial oil-impregnated mops and cloths.

THE PREFERRED EMBODIMENT

Referring to the drawing, the numeral 10 identifies a washing machine capable of operating with an oil-cleaning medium and which can take the form, for example, of a cylindrical drum which can be partially filled with oil and rotated to tumble the soiled work. Preferably, the washing machine 10 is arranged so that its drum can be spun at relatively low washing speeds and also at high extracting speeds in order to extract most of the liquid from the work after each oil-bath washing cycle, and thus forms a combination washing and extracting apparatus under the control of a motor 10a and a programmer 10b. A typical machine for accomplishing these various functions is disclosed in U.S. Pat. No. 3,327,507. The washing machine 10 is drained through a trap 11 to a washer drain pump 12 which discharges through a conduit 12a into a lint removal unit 13, such as a mechanical shaker screen assembly having an oil reservoir 13a and a lint collector 13b. The lint-free oil can be selectively discharged by means of an oil-return pump 14 to either the washing machine 10 through a conduit 15 having a control valve 15a and, in series therewith, an oil heater 16, or a dirty oil tank 17 through a conduit 18 having a control valve 18a and a siphon breaker 18b. If desired, an intermediate or transfer tank 19 can be included in the system as a third discharge circuit from the lint removal unit through a conduit 20 having a control valve 20a. The output of this transfer tank can be shunted directly back to the washing machine 10 via a conduit 21 including a transfer pump 22. Thus, a batch of slightly soiled oil, such as that used for the last of a plurality of washing cycles, can be used for the first washing cycle of a new batch of highly soiled work, all as described in greater detail below. A bypass line 23 including a bypass valve 23a can be used to shunt the output of the transfer pump 22 directly back to the transfer tank for agitation to maintain the soil particle suspension.

The multiple tank system also includes a clean oil tank 24 having a filling inlet 25 with a vent 26 and an outlet system in the form of a pump 27 working into a manifold 28 having three selectively valved discharge conduits 29, 30 and 31, the former feeding the washing machine 10 and the latter two being interconnected with a continuous through-put filter system indicated generally by the numeral 32. The filter system 32 receives the output of the dirty oil tank 17 by means of a filter feed pump 33, a valved conduit 34 and a feed spray head 34a, and includes a rotary cylindrical filter wheel 35 having liquid- and air-tight side walls and a structurally rigid, porous circumference to which a thick layer of expendible filter material 35a, such as diatomaceous earth, is applied. The filter cake layer 35a is applied as an oil slurry from a precoat tank 36 by means of a pump 37, a conduit 38 and a discharge head 39.

The filter coat is drawn to and held on the circumference of the filter drum 35 by means of a vacuum pump 40, which evacuates the center of the drum through conduits 41 and 42 (the former being coupled through a sealing gland on the axis of rotation) between which is disposed an oil-separating receiver tank 43 to separate the oil from the air. The oil output from the receiver 43 is fed by a pump 44 and valved conduit 45 to the clean oil tank 24. The output can also be selectively fed to the precoat slurry tank 36 by a valved conduit 46. The rotary filter drum 35 is immersed at its lower portions in an oil tank 47 into which that portion of the dirty oil discharged from the spray head 34a which is not drawn through the filtering cake is accumulated. A dirty oil bypass conduit 48, including a valve 48a, also connects the dirty oil tank, via the pump 33 and conduit 34, to the filter tank 47. As the drum 33 rotates in its oil tank 47, it continues to pick up soiled oil, which is filtered and passed to the clean oil tank 24, as described. Excess as well as overflow dirty oil from the filter tank 47 is fed by a pump 49 and valved conduit 50 back to the dirty oil storage tank 17. In this fashion, the dirty oil can be kept in continuous motion to help maintain the solids in suspension. The flow can also be directed to the precoat tank 36 by a valved conduit 51.

A heater 52 can be included in the conduit 34 between the feed pump 33 and the filter drum 35. As the filter drum 35 rotates, a movable scraper or doctor blade 53 lifts the top thin layer of matter including a mixture of the caked filter powder and particulate soil from the drum, causing it to drop into a dry soil accumulator bag 54. The blade can be screw fed inwardly at a rate sufficient to maintain fresh filtering surfaces on the drum coating 35a and a continuous through-put of filtered oil results without any significant loss of oil in the relatively dry and inert waste. To assist in the initial application and conditioning of the filter cake on the drum, the clean oil conduit 31 from the pump 27 includes a spray head 31a which discharges onto the drum.

In operation, assuming a filter cake 35a has been applied to the filter drum 35 by means of the precoat tank connection as described above, and assuming the vacuum pump is in operation and also that the dirty oil and clean oil tanks 17 and 24 are reasonably charged, there will be a continuous flow of filtered, clean oil from the dirty tank to the clean tank. A soiled load or batch of work is placed in the washing machine 10 and the clean oil pump 27 is actuated to charge the machine with clean washing oil through the conduit 29. While the washing machine is going through its washing and extracting cycles, a substantial volume of dirty oil from the dirty oil tank will be passed through the filter system 32 to the clean oil tank, thereby rendering the dirty oil tank capable of receiving the soiled washing oil from the machine 10 by means of the circuit including the washer drain pump 12, the mechanical lint screen 13, the oil return pump 14, and the valved conduit 18. The conduit 34 leading from the dirty oil tank 17 and its filter feed pump 33 includes the heater element 52 which should be activated during filtering to raise the temperature of the oil to 160°–175° F. for the purpose of reducing the viscosity of the oil to improve the filtering action and to further solubilize any remaining waxes and grease which might remain in the oil as impurities.

During the washing cycle, however, it is also possible to maintain a complete recycling of washing oil through a recirculating circuit in which the discharge from the oil return pump 14 is fed through the conduit 15 and oil heater 16 back to the washer. This recirculating flow removes lint and maintains the oil at a relatively high temperature for purposes of sterilization. As the temperature of the oil is increased, however, the oil viscosity decreases, a condition which has been found to be detrimental to efficient overall operation because of the inability of a very low viscosity medium to disperse particulate solids. Accordingly, it is preferred to operate the washing cycle with the oil at a temperature of 125°–150° F. In order to reduce the demand on the clean oil reservoir and on the filter system, it is preferred to perform three complete washing cycles without intermediate extraction cycles.

Prior to initiating the extraction cycle in which the drum is spun at a high rate of speed, the temperature of the oil is raised in accordance with the invention to approximately 160°–175° F. to serve the additional functions of (i) solubilizing waxes and grease which might have been picked up in the mops, (ii) reducing the viscosity of the oil to improve the extraction characteristics to enable the oil content in the mops to be reduced, and (iii) effecting maximum sterilization. It will be understood that the critical last extracting cycle which is designed to leave a predetermined volume by weight of oil in the work is achieved by controlling the temperature of the oil to control its viscosity, as well as the duration of the extracting cycle, given a predetermined extraction speed which is part of the washing machine design. In the case of oil-impregnated textile-fiber dust mops, for example, impregnating oil in the amount of 20 to 50 percent by weight has been found to be effective with the lesser amounts being used in the case of lower quality or woven textile material. Such mops are capable of picking up an additional 20 percent by weight in non-soluble particulate soil from such surfaces as concrete and tile, without leaving a detrimental oil residue on the floor. By reprocessing the mops in accordance with the present invention, not only is the life of each mop extended over that which would result if the mops were cleaned by conventional water detergent washing or by drycleaning solvents, but because the system is entirely closed, it is virtually pollution-free. With the only output comprising clean impregnated mops as the work product and a mixture of inert particulate soil and inert filtering medium as the by-product, environmental pollution is substantially eliminated, unlike washing processes which yield soiled detergent-loaded water or drycleaning processes which yield solvent-laden drycleaning muck.

In the case of each washing cycle, a fresh batch of clean oil is normally introduced into the machine at the beginning of each cycle. If desired, however, the last batch of used oil from a previous work load can be directed by the oil return pump 14 to the transfer tank 19 via the conduit 20 to be pumped back into the washing machine for the first cleaning cycle of the soiled work load which follows, using the transfer pump 22 and conduit 21.

It will be understood that the apparatus and methods of the present invention can be modified to suit specific cleaning requirements. Thus, for example, the transfer tank 19 can be eliminated from the system or, if desired, additional transfer tanks can be provided for holding oils of different degrees of contamination. Also, heating stages can be introduced where required and various preliminary coarse filtering techniques can be used. The invention should not, therefore, be regarded as limited except as defined in the following claims:

I claim:

1. A method for reprocessing soiled oil-impregnated cleaning implements having textile bodies, comprising the steps of immersing the cleaning implements in a large volume of impregnating oil, activating the oil and the cleaning implements to perform at least one washing cycle and remove the soil from the cleaning implements, extracting the oil from the cleaning implements to leave from 20 to 50 per cent oil by weight in the cleaning implements as an impregnation in the textile bodies, forming a slurry of clean oil and a powdered filtering medium, drawing the slurry against a porous carrier by means of differential air pressure to form an oiled filter cake, and exposing the filter cake to soiled oil from the washing cycle under pressure differential to force soiled oil into the filter cake to produce a filtrate of clean oil and a residue of soil in the filtering medium.

2. The method of claim 1, including the steps of passing the filter cake through an air cycle under pressure differential to extract substantially all oil from the soil residue, and skimming off the residue and a small depth of filter powder before re-immersion in the soiled oil.

3. The method of claim 1, including the step of heating the oil flow to the filter means.

4. The method of claim 1 including the step of removing lint from the oil prior to performing filtering or storing operations.

5. A method for reprocessing soiled oil-impregnated cleaning impelements having textile bodies, comprising the steps of heating impregnating oil to approximately 125° to 150° F., immersing the cleaning implements in a large volume of the preheated impregnating oil, activating the oil and the cleaning implements to perform at least one washing cycle and remove the soil from the cleaning implements, raising the temperature of the immersion oil to approximately 160° to 175° F., and extracting the oil from the cleaning implements to leave from 20 to 50 per cent oil by weight in the cleaning implements as an impregnation in the textile bodies, thereby to provide oil of selectively higher viscosity during washing to effect dispersion of particulate soil solids and to provide oil of relatively lower viscosity to effect extraction of the oil from the textile bodies.

* * * * *

UNITED STATES PATENT OFFICE
CERTIFICATE OF CORRECTION

Patent No. 3,746,508          Dated July 17, 1973

Inventor(s) Steven Landon

It is certified that error appears in the above-identified patent and that said Letters Patent are hereby corrected as shown below:

Column 2, line 1, change "Landow" to -- Landon --.

Signed and sealed this 26th day of March 1974.

(SEAL)
Attest:

EDWARD M. FLETCHER, JR.　　　　　　　C. MARSHALL DANN
Attesting Officer　　　　　　　　　　　Commissioner of Patents

UNITED STATES PATENT OFFICE
CERTIFICATE OF CORRECTION

Patent No. 3,746,508          Dated July 17, 1973

Inventor(s) STEVEN LANDON

It is certified that error appears in the above-identified patent and that said Letters Patent are hereby corrected as shown below:

Please correct the title (two occurrences) to read:

PROCESS FOR REMOVING SOIL FROM AND
FOR TREATING CLEANING MOPS AND RAGS.

Signed and sealed this 26th day of November 1974.

(SEAL)
Attest:

McCOY M. GIBSON JR.
Attesting Officer

C. MARSHALL DANN
Commissioner of Patents